US00RE45866E

(19) United States
(12) Reissued Patent
DeMasi

(10) Patent Number: US RE45,866 E
(45) Date of Reissued Patent: Jan. 26, 2016

(54) TENNIS RACQUET WITH REPLACEABLE PLAYING SURFACE

(71) Applicant: Gary M. DeMasi, Webster, NH (US)

(72) Inventor: Gary M. DeMasi, Webster, NH (US)

(21) Appl. No.: 14/120,530

(22) Filed: May 31, 2014

Related U.S. Patent Documents

Reissue of:
(64) Patent No.: 8,192,308
Issued: Jun. 5, 2012
Appl. No.: 12/928,920
Filed: Dec. 22, 2010

U.S. Applications:
(60) Provisional application No. 61/396,234, filed on May 24, 2010.

(51) Int. Cl.
*A63B 49/02* (2015.01)
*A63B 49/14* (2015.01)

(52) U.S. Cl.
CPC ..... *A63B 49/038* (2015.10); *A63B 49/035* (2015.10); *A63B 49/14* (2013.01)

(58) Field of Classification Search
CPC ..... A63B 49/0294; A63B 49/14; A63B 49/0288; A63B 49/06; A63B 59/0092; A63B 51/007; A63B 49/035; A63B 49/038
USPC ..... 473/524, 532–534
See application file for complete search history.

(56) References Cited

U.S. PATENT DOCUMENTS

| | | | | |
|---|---|---|---|---|
| 2,004,609 | A | 6/1935 | Johnston | |
| 3,707,288 | A | 12/1972 | Edlefsen | 473/532 |
| 3,843,121 | A | 10/1974 | Edlefsen | |
| 3,891,211 | A | 6/1975 | Diefenbach | |
| 4,124,209 | A | 11/1978 | DiLeo | 473/532 |
| 4,135,717 | A | 1/1979 | DiLeo | |
| 4,274,634 | A | 6/1981 | Berluti | 473/532 |
| 4,357,012 | A | 11/1982 | Maynard | |
| 5,005,834 | A | 4/1991 | Ferrari | |
| 5,211,396 | A | 5/1993 | Ferrari | |
| 5,413,335 | A | 5/1995 | Braun | |
| 6,071,203 | A | 6/2000 | Janes | |
| 6,964,624 | B2 * | 11/2005 | Shen et al. | 473/521 |
| 2011/0287876 | A1 | 11/2011 | DeMasi | |

FOREIGN PATENT DOCUMENTS

| | | | |
|---|---|---|---|
| DE | 3521621 | A1 * | 1/1986 |
| GB | 2196536 | A * | 5/1988 |
| JP | 20012699423 | A * | 10/2001 |

* cited by examiner

*Primary Examiner* — Patricia Engle
(74) *Attorney, Agent, or Firm* — Davis & Bujold, P.L.L.C.; Michael J. Bujold

(57) ABSTRACT

A tennis racquet with a replaceable playing surface includes a frame, a cartridge, and a cartridge-lock with at least one key. The frame defines a cartridge support groove, a front upper half-oval bridge and a back upper half-oval bridge. Each bridge includes a head-guard. The front bridge with its head-guard and the back bridge with its head-guard define a planar passage way between the bridges. The cartridge includes a rim threaded with a string. The string defines a playing surface. The cartridge is shaped for removable snug fit in the support groove and in the planar passageway, such that when a replacement cartridge is snug within the frame, and when the at least one key is entered into the at least one key-aperture, the replacement cartridge is locked to the frame.

20 Claims, 11 Drawing Sheets

View at A-A in FIG. 2

AMENDED FIGURE

View at B-B in FIG. 4

NEW FIGURE

View at C-C in FIG. 8

TENNIS RACQUET WITH REPLACEABLE PLAYING SURFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority to co-owned, co-pending U.S. provisional application Ser. No. 61/396,234, filed May 24, 2010.

FIELD OF THE INVENTION

This invention relates generally to a tennis racquet having a replaceable playing surface.

BACKGROUND OF THE INVENTION (1) Field of the Invention

The present invention relates to the field of sporting goods, and more specifically to the type of tennis racquet that includes a cartridge, the cartridge having a rim threaded with a string to define a playing surface, and wherein the cartridge is readily removable and replaceable by another cartridge.

(2) Description of the Prior Art

Applicant notes the many attempts to make a tennis racquet with a replaceable cartridge over the past 30 years, but none of these attempts has achieved commercial success.

What is still needed is a racquet component system that allows quick interchangeability of string heads. String heads can be interchanged to allow rapid repair of damaged strings during a game or match or at any time that it is not possible or appropriate to repair the damaged strings. Interchangeable string heads also allow for the rapid and convenient substitution of different string types and varying string tensions into the racquet. String heads may also be interchanged to allow the introduction of a different weight of string head into the racquet system.

SUMMARY OF THE INVENTION

The invention provides a tennis racquet with a frame, a cartridge defining a replaceable playing surface, and a cartridge-lock with at least one key.

The frame includes a handle and an oval head attached to the handle. The oval head includes a lower half-oval frame-portion and an upper half-oval frame-portion. The frame defines at least one key-aperture. The lower half-oval frame-portion defines a lower half-oval cartridge support groove. The upper half-oval frame-portion defines a front upper half-oval bridge with a front head-guard and a back upper half-oval bridge with a back head-guard. The front bridge with its head-guard and the back bridge with its head-guard define a planar passage way.

The cartridge has a rim threaded with string, and the string defines a playing surface. The cartridge is adapted for insertion into and for removal from the planar passageway.

The cartridge-lock has at least one key shaped for entry into the at least one key-aperture to lock the cartridge into the frame. So when a cartridge is inserted snug within an empty frame, and when the at least one key is entered into the at least one key-aperture, the cartridge is locked to the frame. The cartridge-lock enables a tennis player to remove a present cartridge from the frame and replace the present cartridge with a replacement cartridge without the use of tools.

In a first preferred embodiment, the cartridge-lock is a mid-frame cartridge-lock, each key-aperture is a mid-frame key-aperture, and each key is adapted to pass through a key-aperture of the cartridge and a corresponding key-aperture of the frame.

A lower portion of the cartridge rim includes a tongue that defines at least one cartridge key-aperture. The lower half-oval cartridge support groove includes a deep groove portion adapted to accept the tongue.

The tongue defines a plurality of cartridge key-apertures, and the lower half-oval frame-portion defines a corresponding plurality of mid-frame key-apertures.

The cartridge-lock includes a rail. A first end of the rail is attached to the frame. A second end of the rail defines a stop.

The tongue defines a rail-clearance slot and the cartridge-lock further includes a key-assembly comprising a key-mount and an attached plurality of keys. The key-assembly is mounted to the rail for sliding movement to and fro along the rail. The cartridge-lock further comprises a compression spring located on the rail between the key-mount and the stop.

Each key of the key-assembly corresponds to one associated cartridge key-aperture and one associated mid-frame key-aperture.

The cartridge is shaped for snug fit with the planar passageway and the lower half-oval cartridge support groove when cartridge is inserted into the planar passageway.

In a first-disclosed embodiment, the cartridge-lock further comprises an upper pull-plate and a lower pull-plate, each pull-plate having an outer gripping surface.

In the first-preferred embodiment, the cartridge-lock further comprises a pull-cap having an outer gripping surface.

In the first-preferred embodiment tennis racquet comprises a cartridge-lock including a head-guard lock and a head-guard key. The head-guard key includes an elongated, substantially planar strip and a key-release pull-tab. The head-guard key is further shaped to have first and second enlarged edges to fit within first and second shaped-grooves of front and back head-guards respectively.

DETAILED DESCRIPTION OF THE INVENTION

First Preferred Embodiment

A first preferred embodiment of the invention provides a tennis racquet comprising a cartridge that defines a playing-surface, a frame that defines a planar passageway for accepting the cartridge, and a at least one cartridge-lock that locks the cartridge into the planar passageway. The cartridge and the frame are shaped and sized to permit quick and easy removal of a cartridge from the frame, and quick and easy insertion of a replacement cartridge into the frame.

The first preferred embodiment includes a mid-frame spring-loaded cartridge-lock *30* with a cartridge pull-cap, and a head-guard cartridge-lock *27*.

In a first-described embodiment, the mid-frame cartridge-lock includes a spring-loaded mid-frame cartridge-lock with pull plates. The first-described embodiment is illustrated in FIGS. 1-11. In the first preferred embodiment, the cartridge-lock includes a spring-loaded mid-frame cartridge-lock with *a* pull [plates] *cap*. The first preferred embodiment is illustrated in FIGS. 1-8 and 12.

Mid-Frame Cartridge-Lock with Cartridge Pull-Plates

Figure 1:
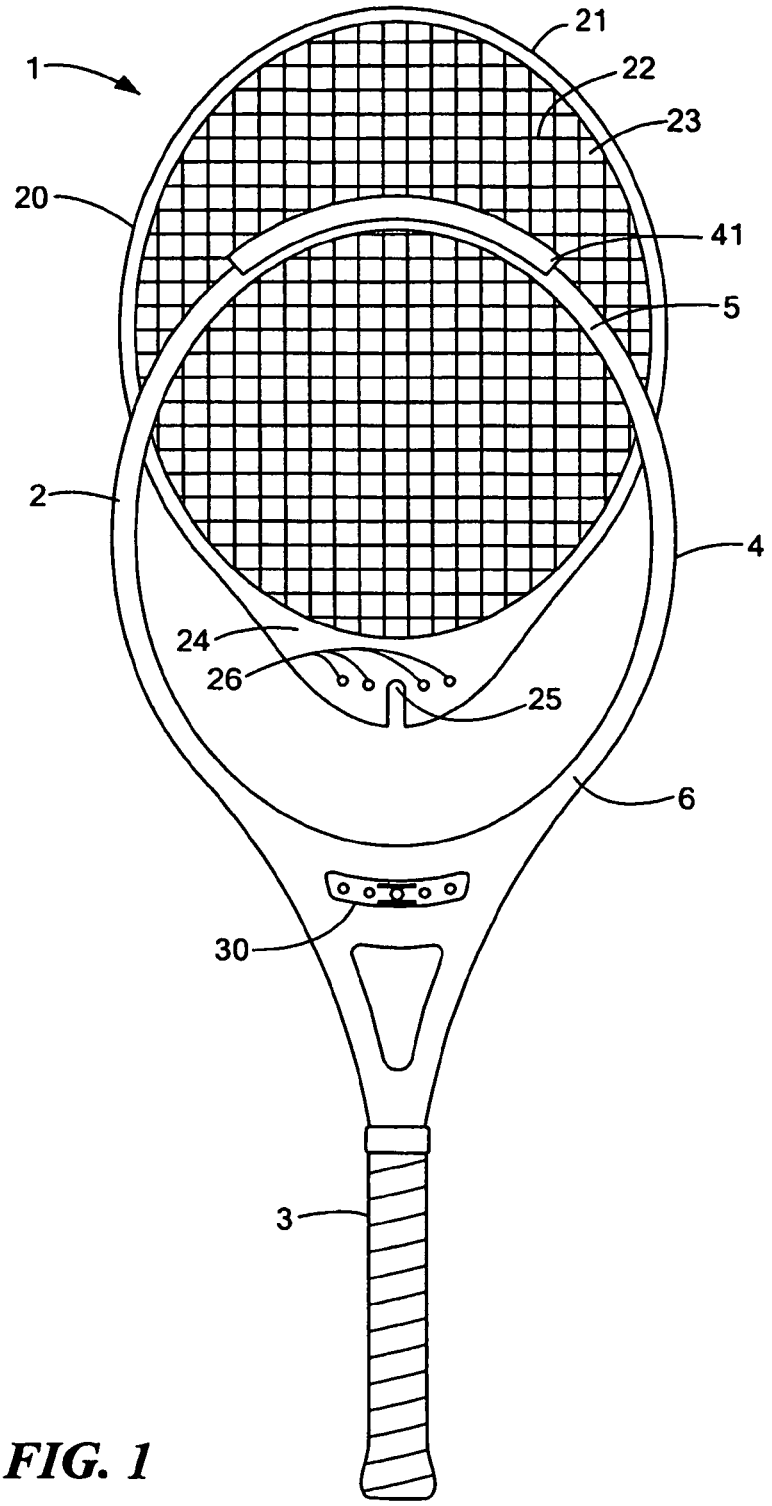
FIG. 1 shows the frame of a first tennis racquet receiving a replacement cartridge.

FIG. 1 is a front view showing frame 2 of the first preferred embodiment receiving cartridge 20. Frame 2 receives cartridge 20 via planar passageway 9. (See FIG. 3 to view planar passageway 9).

Figure 3:
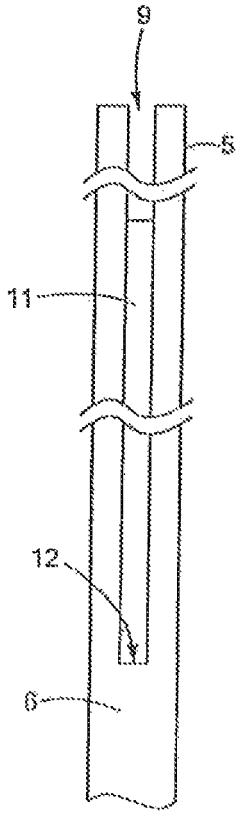
FIG. 3 is a cut-away side view of the top of the frame showing a planar passageway.

Returning to FIG. 1, frame 2 includes handle 3 and oval head 4. Oval head 4 defines an upper half-oval frame-portion 5 and a lower half-oval frame-portion 6. Upper half-oval frame portion 5 defines a front bridge 7 and a back bridge 8. Bridges 7 and 8 define planar passageway 9 between them, as shown in FIG. 3.

Figure 2:
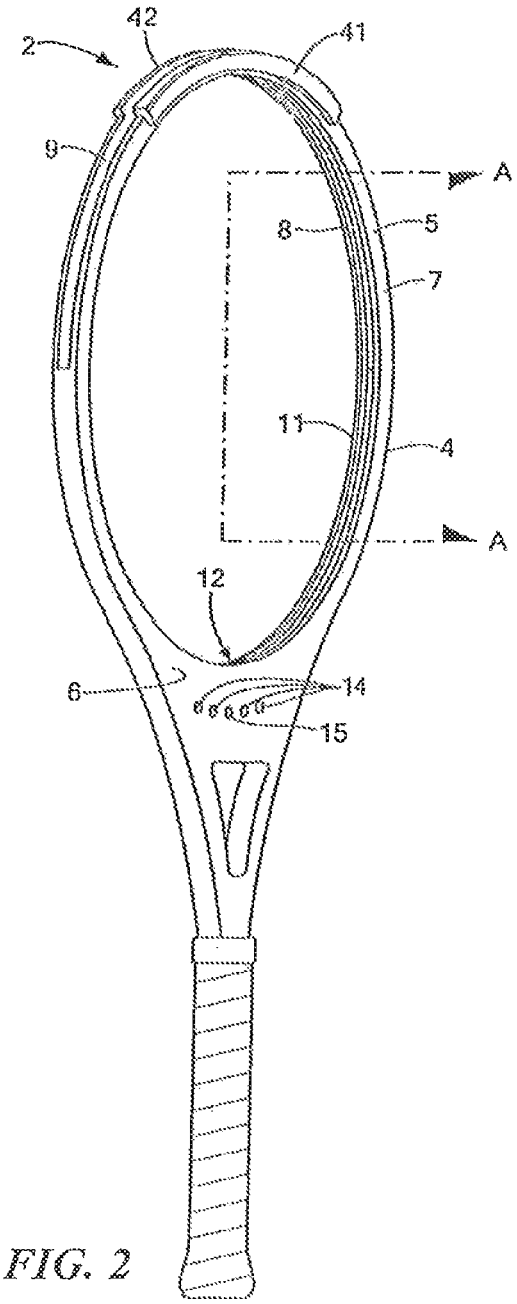
FIG. 2 is a perspective view of a tennis racquet frame of a first preferred embodiment.

FIG. 2 shows lower oval head 4 defining cartridge-support groove 11. Groove 11 is shaped to receive a lower portion of rim 21 of cartridge 20. FIGS. 2 and 3 show cartridge-support groove 11 shaped to accept tongue 24. Cartridge-support groove 11, at its lowest point (deep groove 12), is shaped to accept tongue 24 in snug fit within planar passageway 9. FIG. 3 shows cartridge-support groove 11 inside-view at A-A in FIG. 2. FIG. 2 also shows frame 2 defining four mid-frame key-apertures 14 and mid-frame rail-aperture 15.

Figure 4:
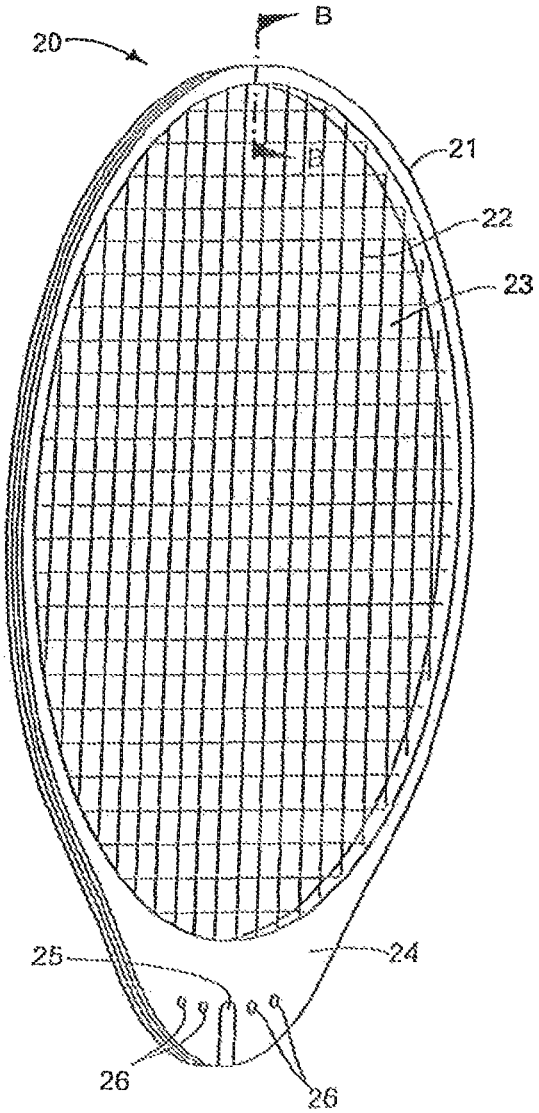
FIG. 4 is a perspective view of a cartridge of a first preferred embodiment.
Figure 5:
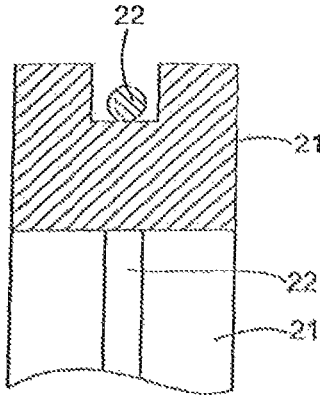
FIG. 5 is a cut-away cross-section side view of the top of the cartridge.
Figure 6:
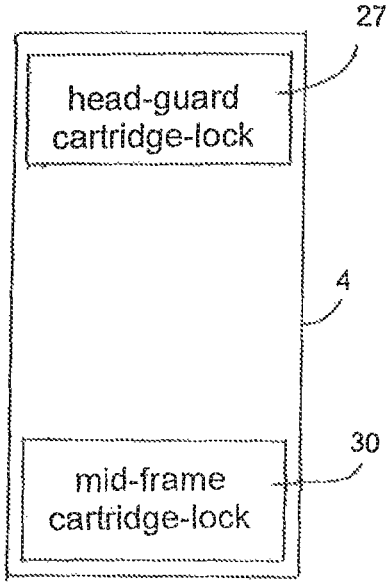
FIG. 6 is a [cut-away cross-section side] *diagrammatic* view of *an arrangement including* first *mid-frame* and second [head-guards] *head-guard cartridge-locks*.
Figure 7:
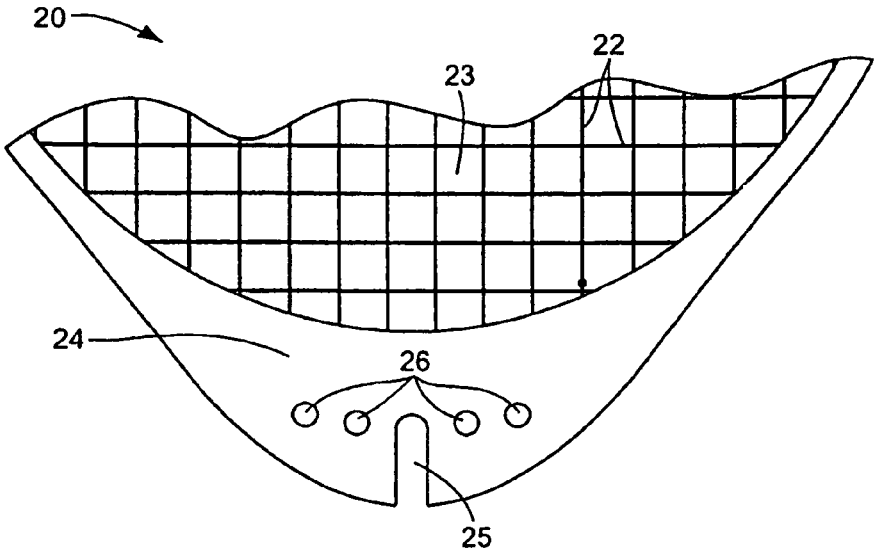
FIG. 7 is a cut-away front view of a lower portion of the cartridge.

FIG. 4 shows cartridge 20 having rim 21 threaded with a string 22. String 22 defines replaceable playing surface 23. FIG. 5 shows rim 21 threaded with string 22 in cross-section front view at B-B of FIG. 4.

FIGS. 1[.], 4, and 7-8[, in cross-section front view at C-C in FIG. 2, also shows] *show* cartridge rim 21 defining tongue 24. FIGS. 1, 4, and 7-8 further show tongue 24 defining rail-clearance slot 25 and four cartridge key-apertures 26.

[FIGS.] *FIG.* 2 [and 6 show] *shows* first and second head-guards 41 and 42 attached to first and back bridge-arms 7 and 8, respectively.

In the first preferred embodiment, mid-frame cartridge-lock 30 is provided to lock the cartridge to the frame. Cartridge 20 is locked, as illustrated in FIGS. 1-3, between bridge 7 and bridge 8, and within planar passageway 9. Cartridge-lock 30 is shown in front view in FIGS. 1 and 8, in perspective view in FIG. 9, and in cross-section view in FIGS. 10-11.

Figure 8:
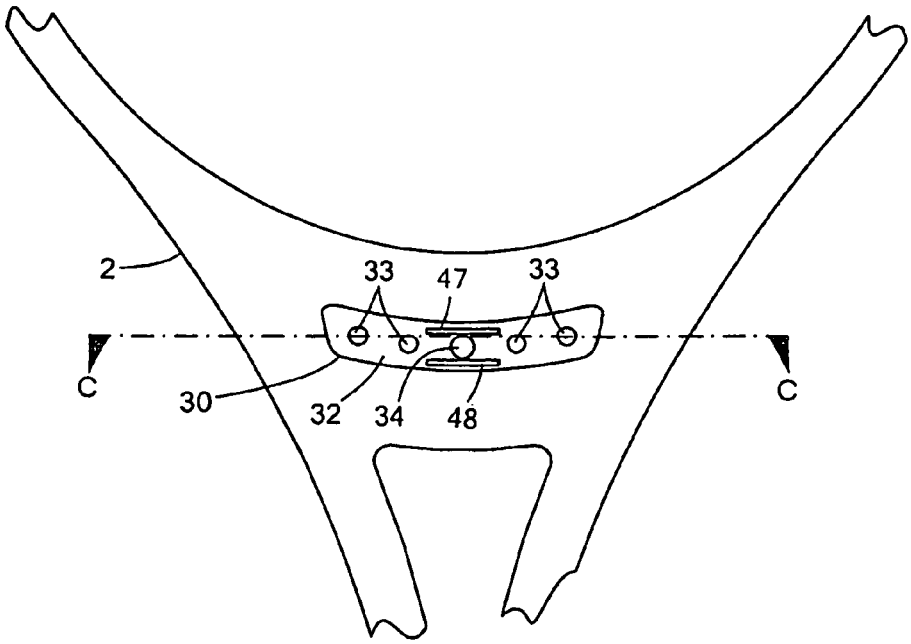
FIG. 8 is a front view of the mid-frame cartridge-lock of a first preferred embodiment.
Figure 9:
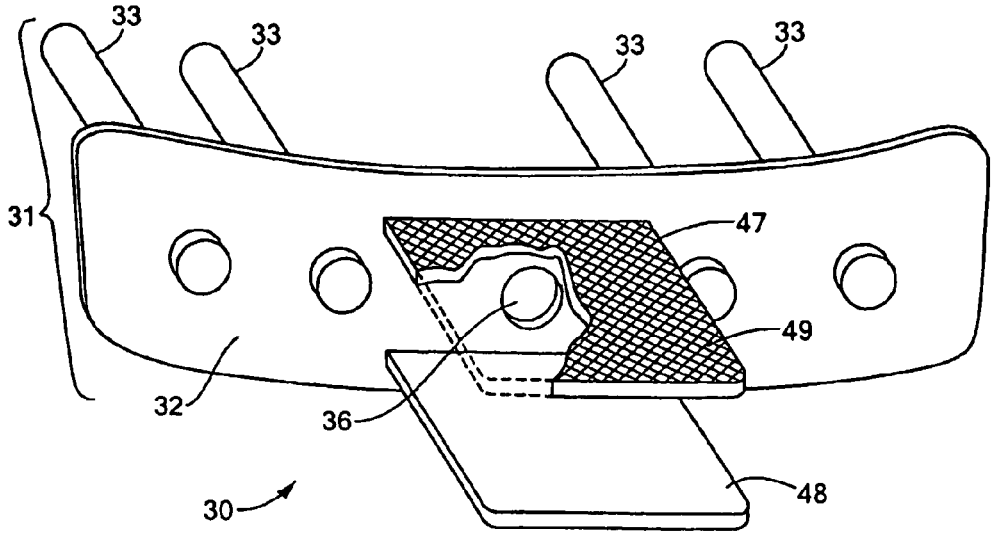
FIG. 9 is a perspective view of a spring-loaded cartridge-lock with pull-plates.
Figure 10:
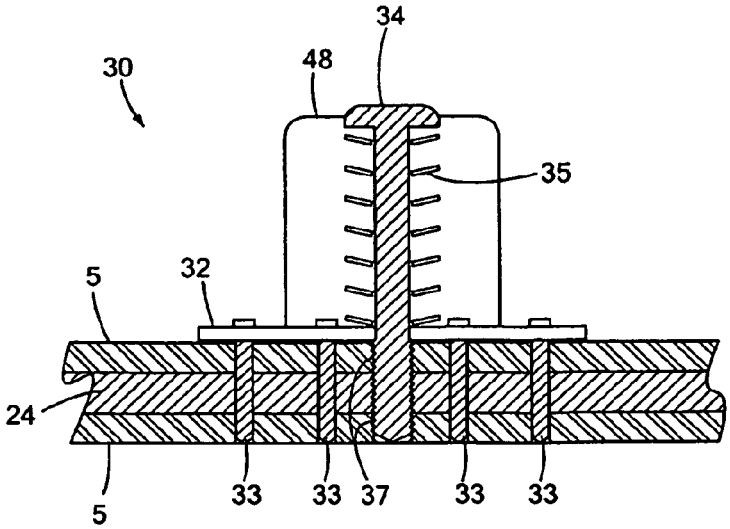
FIG. 10 is a cross-section top view of the cartridge-lock in locked mode.

FIGS. 8-10 show cartridge-lock 30 having key-assembly 31 comprising one key-mount 32 and four keys 33. The four keys are each fixedly mounted to key-mount. FIG. 8 also shows key-mount 32 defining one key-mount aperture 36.

FIG. 9 is a perspective view of cartridge-lock 30. FIG. 9 shows key-mount 32 with its four keys [24] *33*. FIG. 9 also shows upper pull-plate 47 and lower pull-plate 48. Each pull-plate has an outer gripping surface. Outer gripping surface 49 is the gripping surface of upper pull-plate 47.

FIG. 10 is a cross-section top view of cartridge-lock 30, a mid-frame cartridge-lock with pull plates. FIG. 10 shows cartridge-lock 30 having key-mount 32 and four keys 33. Cartridge-lock 30 also includes rail 34 and compression-spring 35. Rail 34 is bonded in two places (bonds 37) to lower half-oval frame 6 proximate to deep groove 12 (see FIGS. 2 and 3). Key-mount 32 is adapted for guided sliding movement through key-mount aperture 36 along an exterior portion of rail 34. FIG. 10 shows cartridge-lock 30 in the locked position. In the locked position, keys 33 penetrate both bridge arms of the frame and the tongue of the cartridge. In this locked position, cartridge-lock 30 prevents the cartridge from moving in any direction with respect to the frame.

Figure 11:
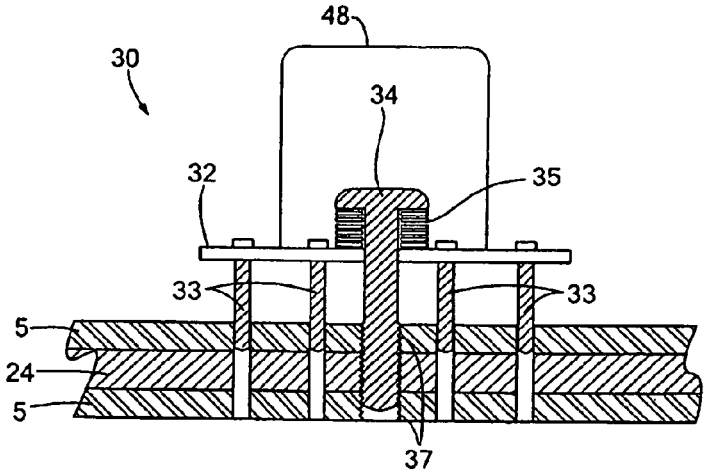
FIG. 11 is a cross-section top view of the cartridge-lock in unlocked mode.

FIG. 11 shows the same mid-frame cartridge-lock 30 and shows the other components of FIG. 10, but shows the cartridge-lock in the unlocked position. In the unlocked position, the keys penetrate only one bridge arm of the frame, and do not penetrate the tongue of the cartridge. This unlocked position of the cartridge-lock permits quick and easy removal of a cartridge from the frame, and quick and easy insertion of a replacement cartridge into the frame.

To remove a cartridge from a frame, or to insert a cartridge into a frame, the tennis player grips the two pull-plates (or the pull-cap) and pulls it the two pull-plates (or the pull-cap) away from the frame. This puts the mid-frame cartridge-lock in the unlocked position. On releasing the grip, the force of compression spring 35 drives the key-mount and the four keys back toward the frame, thereby restoring the cartridge-lock to the locked position.

The cartridge-lock has at least one key shaped for entry into the at least one key-aperture to lock the cartridge into the frame. So when a cartridge is inserted snug within an empty frame, and when the at least one key is entered into the at least one key-aperture, the cartridge is locked to the frame. The cartridge-lock enables a tennis player to remove a present cartridge from the frame and replace the present cartridge with a replacement cartridge without the use of tools.

Mid-Frame Cartridge-Lock with Cartridge Pull-Cap

Figure 12:
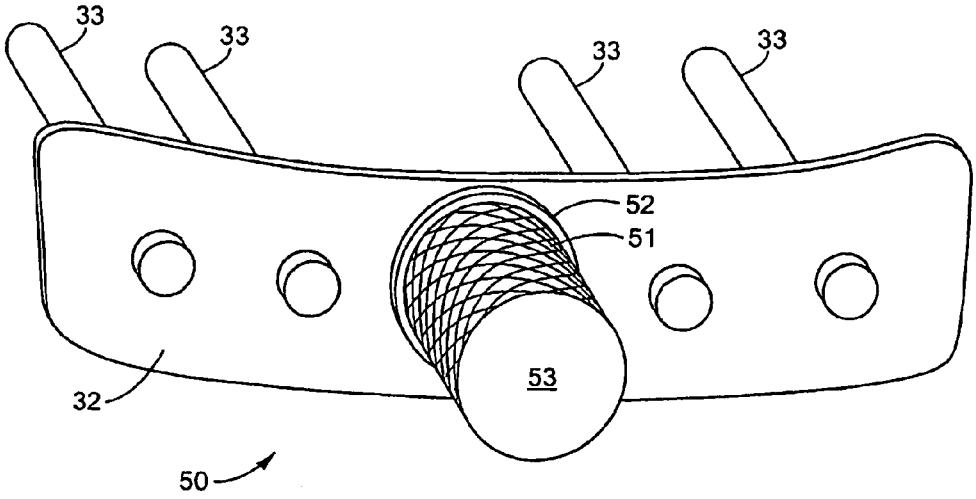
FIG. 12 is a perspective view of the spring-loaded cartridge-lock with a pull-cap.

An alternative to cartridge-lock 30, which uses upper and lower pull-plates 47 and 48, is shown in FIG. 12. FIG. 12 shows mid-frame cartridge-lock 50 including pull-cap 51. Pull-cap 51 is shown bonded to key mount 32 at attachment rim 52.

Head-Guard Cartridge-Lock with Shaped Key & Pull-Tab

The first preferred embodiment includes a head-guard cartridge-lock.

Figure 13:
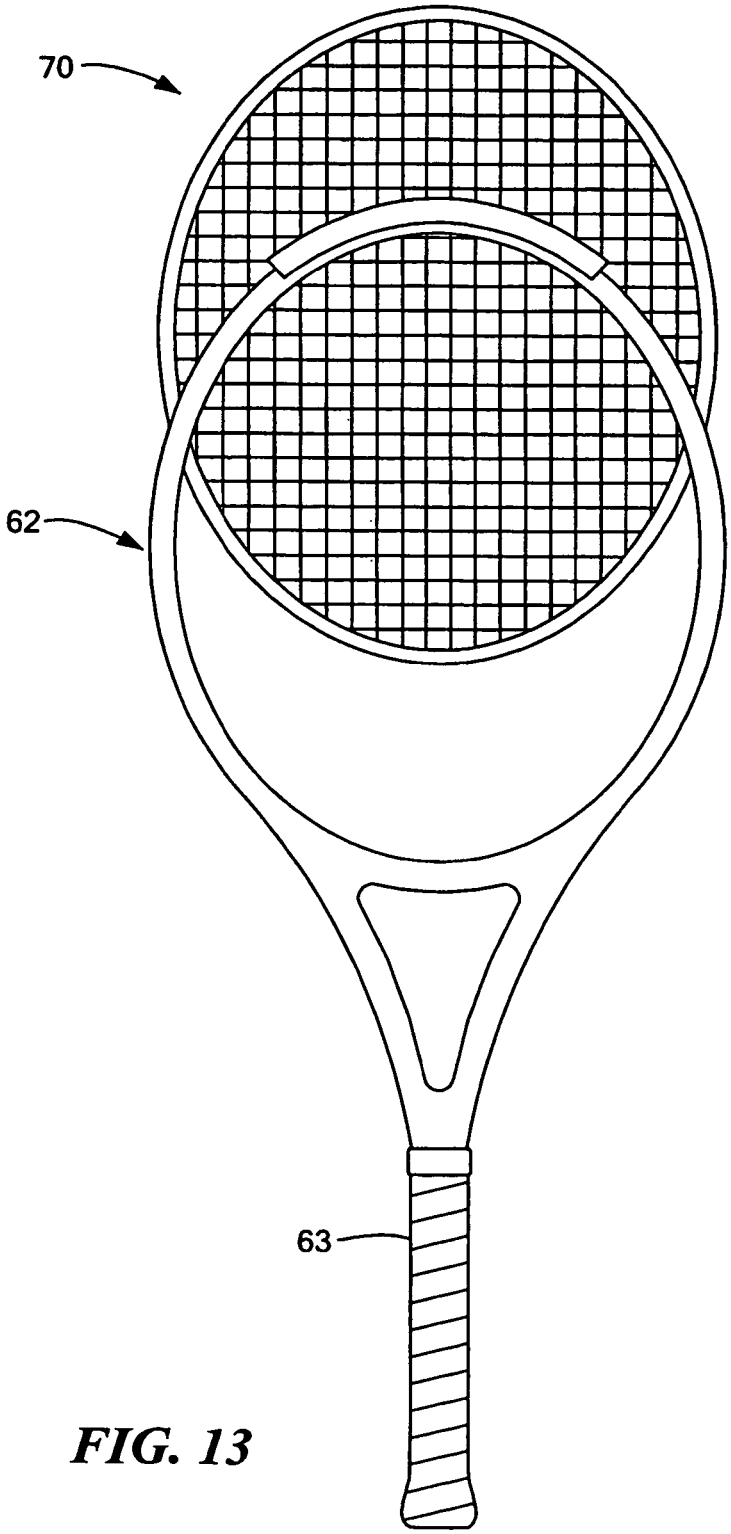
FIG. 13 shows the frame of a second tennis racquet receiving a replacement cartridge.

FIG. 13 is a front view of the frame and cartridge of a tennis racquet having a head-guard cartridge-lock. Frame 62 is shown receiving insertion of cartridge 70.

Figure 14:
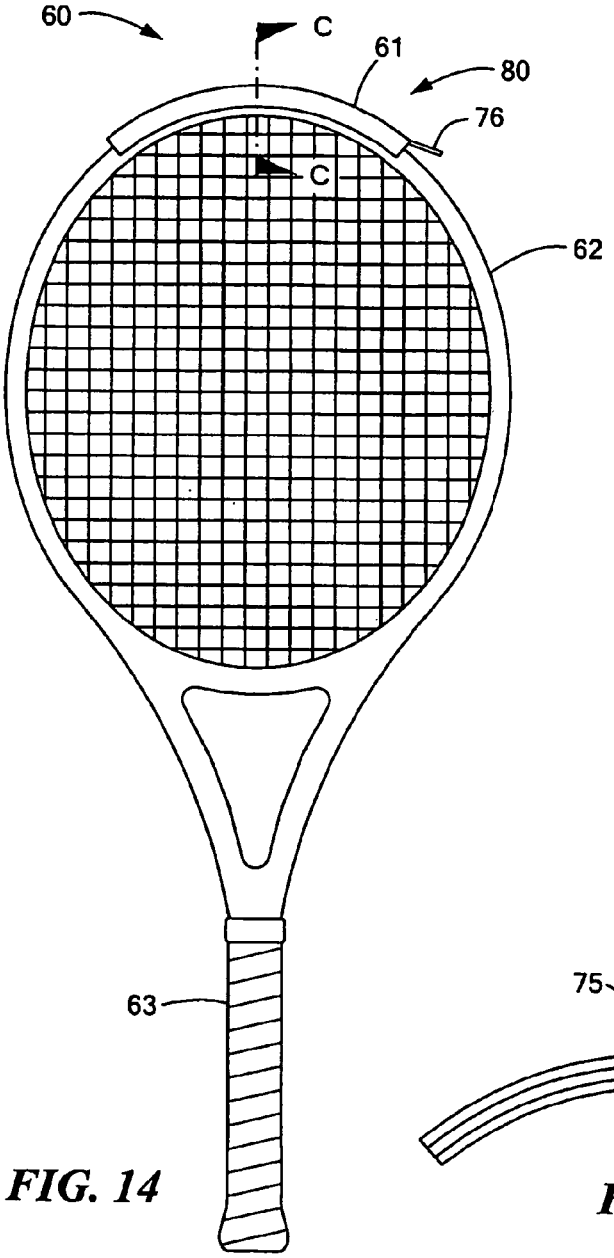
FIG. 14 shows the second tennis racquet having a head-guard cartridge-lock.

[C] *FIG. 14* is a front view of tennis racquet 60 with head-guard cartridge-lock 80. FIG. 14 also shows front head-guard 61 and key-release pull-tab 76 of cartridge-lock 80.

Figure 15:
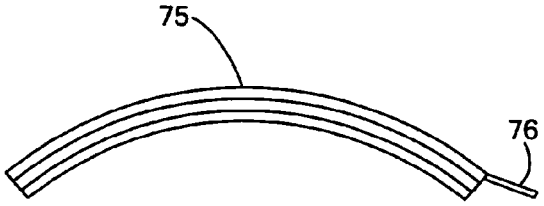
FIG. 15 shows a key and a key-release pull-tab for the second tennis racquet.

FIG. 15 is a side view of key 75 with its key-release pull-tab 76.

Figure 16:
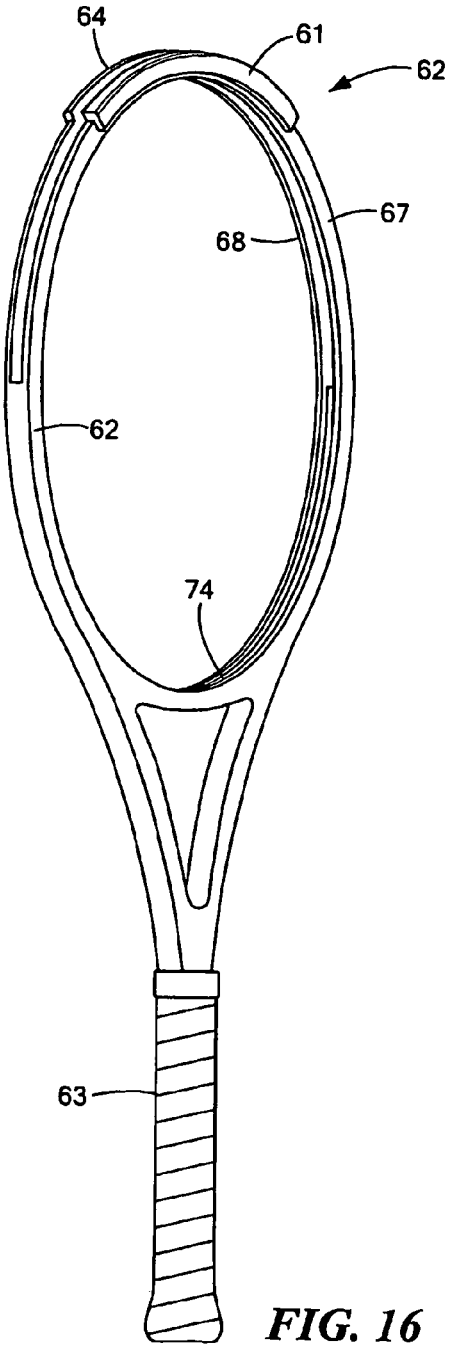
FIG. 16 shows a racquet frame with two head-guards and a cartridge-support groove.

FIG. 16 is a perspective view of frame 62 with front head-guard 61 and back head-guard [69] *64* attached to front bridge 67 and back bridge 68, respectively. FIG. 16 also shows cartridge-support groove 74.

Figure 17:
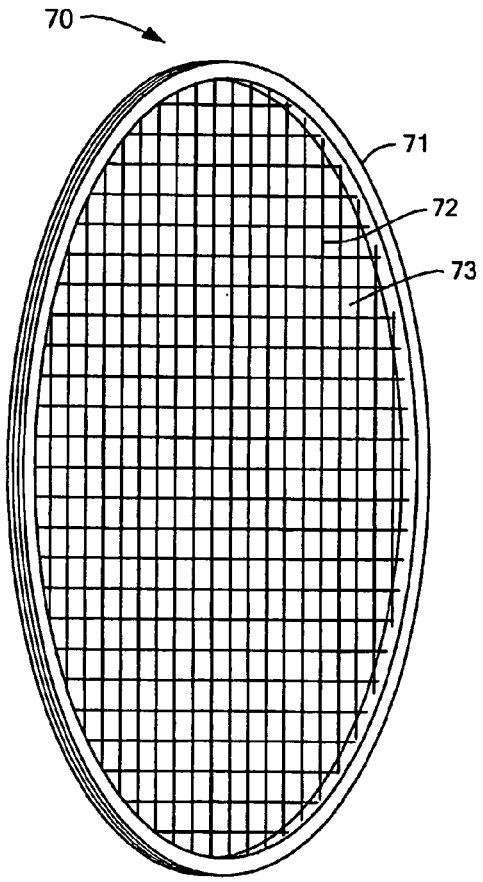
FIG. 17 shows a replaceable cartridge having a rim, a string and a playing surface.

FIG. 17 is a perspective view of cartridge 70 showing rim 71, string 72 and playing surface 73.

Figure 18:
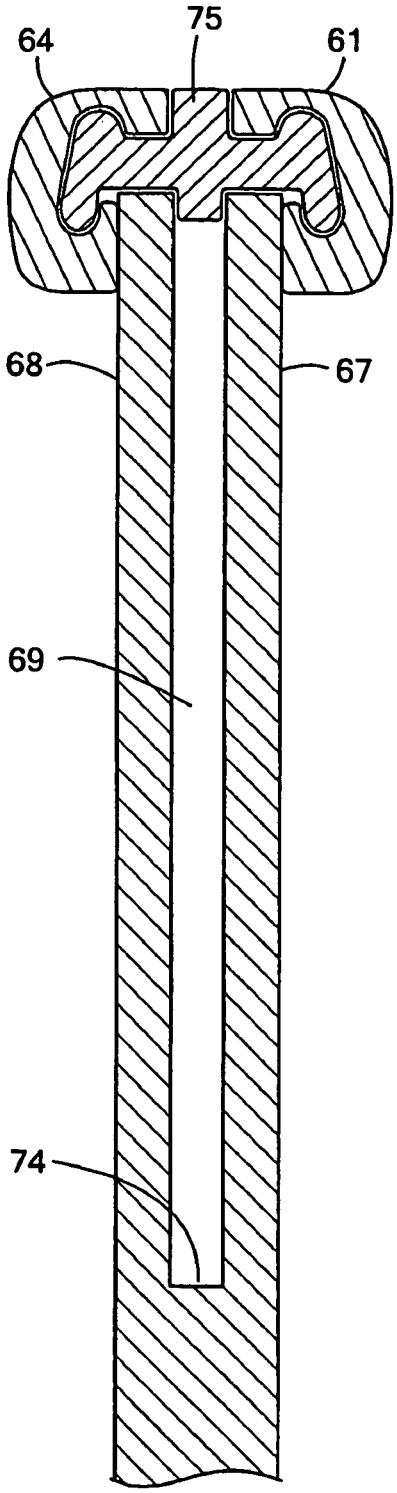
FIG. 18 shows in cross section a head-guard cartridge-lock having a planar passageway.

FIG. 18 is a partial cross section view of frame 62 shown in FIG. 16. FIG. 18 shows cartridge-lock 80 having front head-guard 61, back head-guard 64 and key 75. Key 75 is an elongated, substantially planar strip as shown in FIG. 15. The main body of key 75 has a shaped cross-section as shown in FIGS. 18 and 19.

Figure 19:
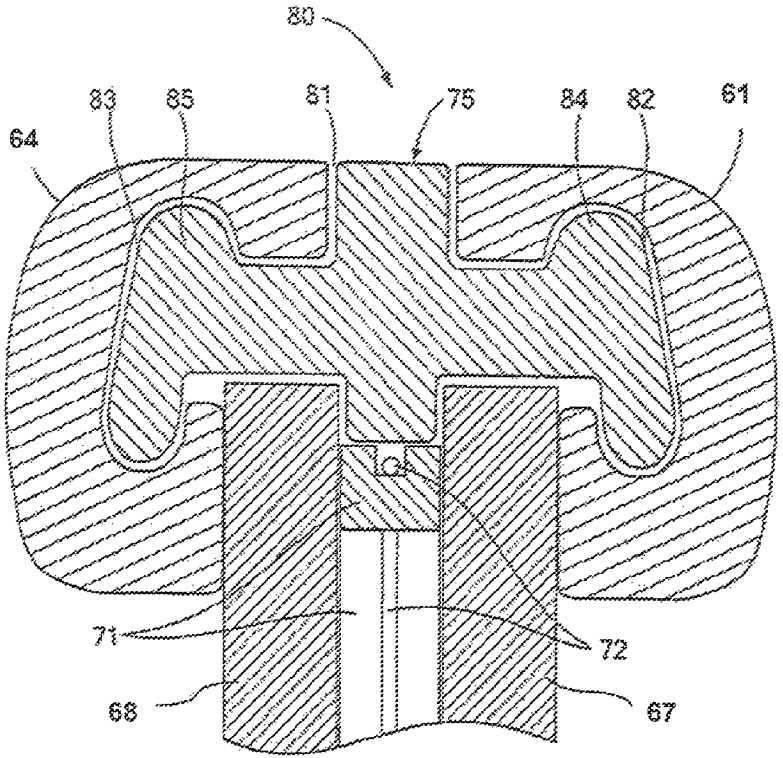
FIG. 19 shows greater detail of the head-guard cartridge-lock of FIG. 18.

FIG. 19 is a partial cross section view of the oval head of tennis racquet 60 at C-C of FIG. 14. FIG. 19 also shows head-guard cartridge-lock 80 having front head-guard 61, back head-guard 64 and key 75. FIG. 19 further shows key 75 having first enlarged edge 84 and second enlarged edge 85. Edges 84 and 85 are sized allow insertion of key 75 into key aperture [8] *81*. Head-guard key-aperture 81 is largely defined by first and second shaped key-grooves 82 and 83. Head-guard cartridge-lock 80 locks a cartridge in the frame when a cartridge is fully inserted into the frame and key 75 is fully inserted into head-guard key-aperture 81.

A cartridge is locked into the frame by inserting the cartridge into the frame and then inserting key 75 into the head-guards via key-grooves 82 and 83. One cartridge is unlocked from the frame to enable replacement of the one cartridge by a replacement cartridge by pulling on key-release pull-tab 76 to withdraw key 75 completely from grooves 82 and 83.

Figure 20:
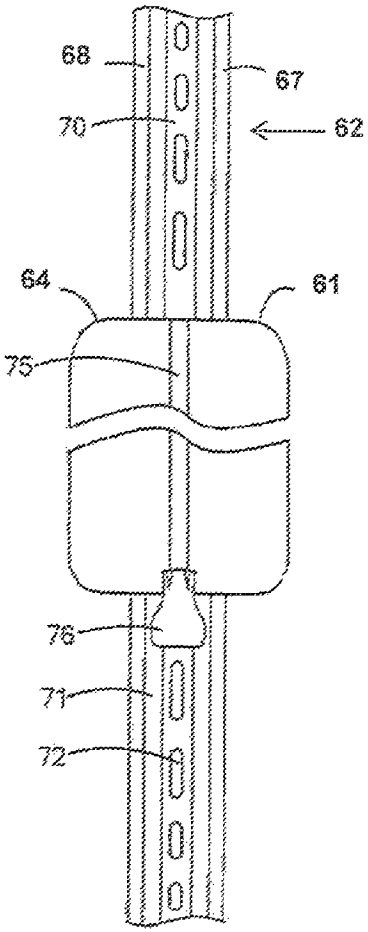
FIG. 20 is a top view of the head-guard cartridge-lock of FIGS. 18 and 19.

FIG. 20 is a cut-away top view of head-guard cartridge-lock 80. The upper portion of FIG. 20 shows cartridge-lock 80 including front head-guard [6] *61*, back head-guard 64 and key 75. The upper portion also shows a top view of front bridge [67] and back bridge [68] enclosing cartridge 70. The lower portion of FIG. 20 shows key 75 including key-release pull-tab 76, and cartridge 70 including rim 71 and string 72.

What is claimed is:

1. A tennis racquet with a replaceable playing surface, comprising:

a frame having a handle [and], an oval head [attached to the handle, wherein the frame defines] *and* at least one key-aperture,

[wherein] the oval head includes a lower half-oval frame-portion that defines a cartridge support groove,

[wherein] the oval head includes an upper half-oval frame-portion that defines a front upper half-oval bridge and a back upper half-oval bridge,

[wherein] the front upper half-oval bridge includes a front head-guard,

[wherein] the back upper half-oval bridge includes a back head-guard, and *the front head-guard and the back head-guard being components of a head-guard lock;*

[wherein] the front *upper half-oval* bridge [with its] *and the front* head-guard and the back *upper half-oval* bridge [with its] *and the back* head-guard define a planar [passage way] *passageway*;

a cartridge having a rim threaded with string,

[wherein] the string defines a playing surface, and

[wherein] the cartridge is adapted for insertion into, and for removal from, the planar [passage way] *passageway*; and a cartridge-lock, including at least one key, [wherein] the at least one key is shaped for entry into the at least one key-aperture to lock the cartridge into the frame;

such that [a] *the* cartridge within the frame may be *manually* removed from the frame and replaced by a replacement cartridge without [the] use of [tools] *an additional tool in addition to the cartridge-lock and the at least one key*.

2. [A] *The* tennis racquet according to claim 1, wherein the cartridge-lock is a mid-frame cartridge-lock, [each] *the at least one* key-aperture is a mid-frame key-aperture, and [each] *the at least one* key is adapted to pass through [a] *the mid-frame* key-aperture of the cartridge and a corresponding key-aperture of the frame.

3. [A] *The* tennis racquet according to claim 1, wherein a lower portion of the cartridge rim includes a tongue defining at least one cartridge key-aperture.

4. [A] *The* tennis racquet according to claim 3, wherein the lower half-oval cartridge support groove includes a deep groove portion adapted to accept the tongue.

5. [A] *The* tennis racquet according to claim 4, wherein the tongue defines a plurality of cartridge key-apertures, wherein the lower half-oval frame-portion defines a corresponding plurality of mid-frame key-apertures, and wherein the cartridge-lock includes a rail, a first end of the rail is attached to the frame, and a second end of the rail defines a stop.

6. [A] *The* tennis racquet according to claim 5, wherein the tongue defines a rail-clearance slot.

7. [A] *The* tennis racquet according to claim 6, wherein the cartridge-lock further includes a key-assembly comprising a key-mount and an attached plurality of keys; wherein the key-assembly is mounted to the rail for sliding movement to and fro along the rail; wherein the cartridge-lock further includes a compression spring located on the rail between the key-mount and the stop, and wherein each key of the key-assembly corresponds to one associated cartridge key-aperture and one associated mid-frame key-aperture.

8. [A] *The* tennis racquet according to claim 7, wherein the cartridge is shaped for snug fit with the planar passageway and the lower half-oval cartridge support groove when cartridge is inserted into the planar passageway.

9. [A] *The* tennis racquet according to claim 8, further comprising an upper pull-plate and a lower pull-plate, each pull-plate having an outer gripping surface.

10. [A] *The* tennis racquet according to claim 8, further comprising a pull-cap having an outer gripping surface.

11. [A] *The* tennis racquet according to claim 1, wherein the [cartridge-lock comprises a] head-guard lock [and] *comprises* a head-guard key.

12. [A] *The* tennis racquet according to claim 11, wherein the head-guard key includes a key-release pull-tab.

13. [A] *The* tennis racquet according to claim 12, wherein the head-guard key is an elongated, substantially planar strip.

14. [A] *The* tennis racquet according to claim 13, wherein the head-guard key is further shaped to have first and second enlarged edges to fit within first and second shaped-grooves of front and back head-guards respectively.

*15. A cartridge suitable for use with a racquet having a frame with a head having an upper portion with a planar passageway and a lower portion with a groove, the head being sized for receiving the cartridge, the lower portion of the head having a cartridge-lock for manually engaging and disengaging the cartridge without use of a tool other than the*

*cartridge-lock to facilitate releasable engagement of the cartridge with the frame, the cartridge comprising:*

*a rim that is strung with string which defines a playing surface;*

*a tongue that extends from the rim and comprises at least one retaining feature; and*

*the rim being receivable within the passageway of the upper portion of the head and the groove in the lower portion of the head such that the at least one retaining feature is alignable with the cartridge-lock,*

*when the cartridge-lock is received by the at least one retaining feature of the cartridge, the cartridge is locked to the frame, and*

*when the cartridge-lock is withdrawn from the at least one retaining feature of the cartridge, the at least one retaining feature of the cartridge is releasable from the cartridge-lock to facilitate removal of the cartridge from the frame.*

*16. The cartridge according to claim 15, wherein the at least one retaining feature of the cartridge comprises a plurality of apertures and the tongue is received within a deepest point of the groove in the frame, and the plurality of apertures of the at least one retaining feature receive keys of the cartridge-lock to lock the cartridge to the frame.*

*17. The cartridge according to claim 15, wherein the rim of the cartridge is passed through the passageway and the tongue is received in the groove in the frame such that, when the at least one retaining feature is aligned with the cartridge-lock, the at least one retaining feature engages the cartridge-lock to lock the cartridge to the frame.*

*18. A tennis racquet with a replaceable playing surface, the tennis racquet comprising:*

*a frame has a head portion and a handle portion that is integral with the head portion;*

*a cartridge having a rim that is strung with a string which defines the playing surface, the cartridge having a tongue, the tongue extends from the rim and has at least one retaining aperture;*

*the head portion of the frame having at least one planar passageway that is sized to receive the cartridge and facilitate releasable engagement of the cartridge with the frame;*

*the frame has at least one locking feature which is adjustable between an engaged position and a disengaged position, the at least one locking feature of the frame, when in the engaged position, is received by the at least one retaining aperture of the tongue to lock the cartridge to the frame, and the at least one locking feature of the frame, when in the disengaged position, is withdrawn the at least one retaining aperture of the tongue to unlock the cartridge from the frame facilitating removal thereof; and*

*the at least one locking feature of the frame being manually adjustable without use of an additional tool to release the cartridge from the frame and facilitate replacement of the cartridge with another cartridge.*

*19. The tennis racquet according to claim 18, wherein the at least one locking feature of the frame is a mid-frame cartridge-lock that comprises a spring and at least one key, the spring of the mid-frame cartridge-lock biases the at least one key which is received within the at least one retaining aperture to lock the cartridge to the frame, the at least one key is removable from the at least one retaining aperture by hand without use of a tool to unlock the cartridge and facilitate removal of the cartridge from the frame through the passageway, the additional tool being defined as a component that is distinct from the at least one locking feature of the frame.*

*20. The tennis racquet according to claim 19, wherein the frame further comprises a head-guard cartridge-lock having front and back head guards, each of the front and the back head guards comprises a slot and are secured to the head portion of the frame on opposite sides of the passageway such that the slots of the front and the back head guards face each other and the passageway extends between the front and the back head guards, the head-guard cartridge-lock has a strip that is received by the slots of both the front and the back head guards to close the passageway and lock the cartridge in the frame when received therein.*

* * * * *